(No Model.)
P. DEEVY & M. G. BUNNELL.
WHEELED DUMPING SCRAPER.
No. 534,324. Patented Feb. 19, 1895.
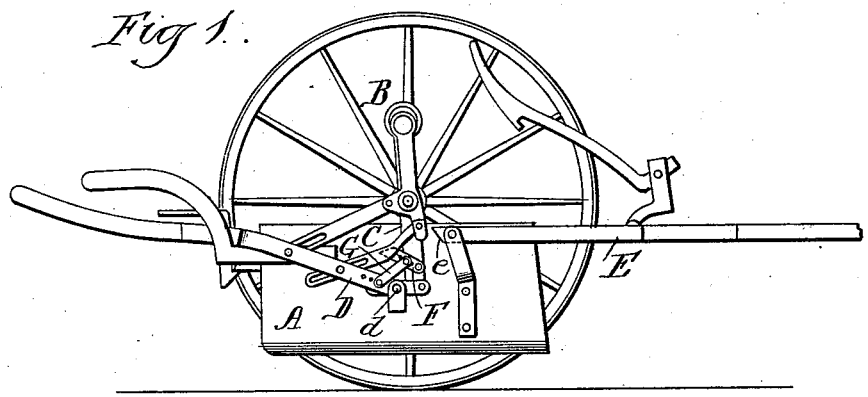
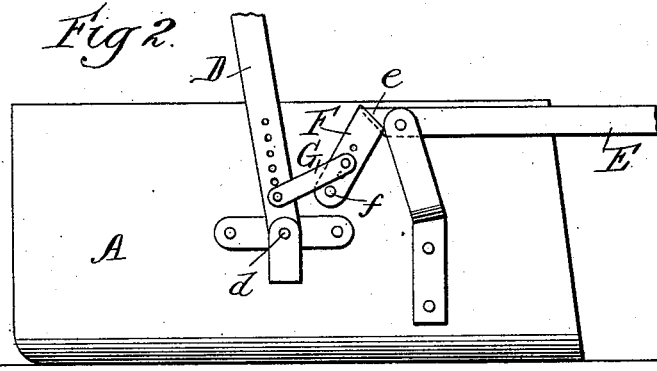 
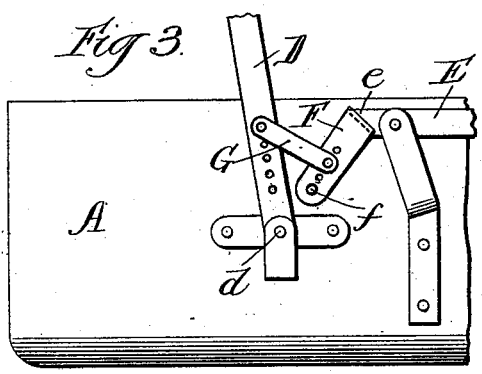 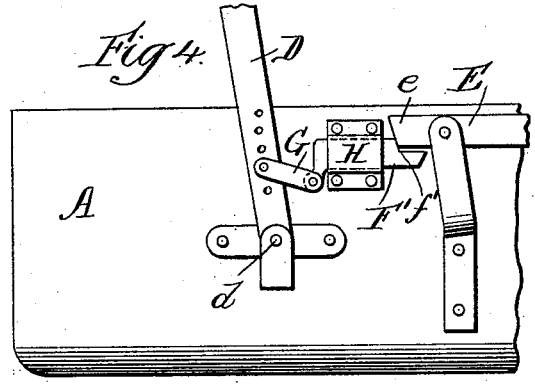
Witnesses
Inventors
Patrick Deevy
Morton G. Bunnell
by Chas. G. Page, Atty.

UNITED STATES PATENT OFFICE.

PATRICK DEEVY, OF HANSEN, NEBRASKA, AND MORTON G. BUNNELL, OF CHICAGO, ILLINOIS, ASSIGNORS TO FREDERICK C. AUSTIN, OF CHICAGO, ILLINOIS.

WHEELED DUMPING-SCRAPER.

SPECIFICATION forming part of Letters Patent No. 534,324, dated February 19, 1895.

Application filed November 27, 1893. Serial No. 492,066. (No model.)

*To all whom it may concern:*

Be it known that we, PATRICK DEEVY, residing at Hansen, in the county of Adams and State of Nebraska, and MORTON G. BUNNELL, residing at Chicago, in the county of Cook and State of Illinois, citizens of the United States, have invented a certain new and useful Improvement in Wheeled Dumping-Scrapers, of which the following is a specification.

Our invention relates more particularly to wheeled dumping scrapers of the kind in which the draft attachment and an operating yoke or bail for raising and lowering the scoop or scraper are pivoted to the latter which is in turn suspended from a crank-axle, and it is also more especially designed as an improvement upon the wheeled scraper embodied in Letters Patent of the United States No. 506,212, granted and issued to Patrick Deevy, one of the present applicants.

In a wheeled dumping scraper characterized by our invention, the draft-arms or bars are provided with extensions in rear of their pivotal connections with the scoop or scraper and the movable locking devices for holding the scraper in an operative position are supported upon the scoop independently of the adjacent lever arms of the yoke or lever but are operated from said lever-arms by suitable connections, so that when the scoop or scraper is lowered, they shall engage the rear extensions of the draft-bars. By such arrangement certain advantages are secured, as hereinafter fully set forth.

In the accompanying drawings,—Figure 1 represents in side elevation a wheeled dumping scraper embodying our invention, with the scoop in a raised position, the near wheel being omitted for convenience of illustration. Fig. 2 is a like view on a larger scale, with the scoop lowered to an operative or working position, and locked by one of the locking devices, the wheels and certain other matters of Fig. 1 being omitted for convenience of illustration. The lever-arm and draft-bar are also shown broken away. Fig. 3 is a view similar to Fig. 2, with a different adjustment of the link-connection between the lever and movable locking dog. Fig. 4 is a similar view showing a sliding locking dog. Fig. 5 shows the notched end of the locking dog.

In said drawings, A indicates the scoop or scraper and B denotes a crank-axle from which the scoop is suspended by standards or hangers C, which are hung upon the high or crank-portion of the crank-axle and attached to the sides of the scoop, as in said Patent No. 506,212.

The operating lever D shown is preferably one of the arms of an ordinary or suitable yoke having its arms pivoted respectively to opposite sides of the scoop, the pivot for one of said arms being indicated at $d$.

The arms or bars of the draft-attachment may be of any ordinary or suitable construction and arrangement, with the exception that each arm is pivoted upon a side of the scoop and provided with a rear extension back of its pivotal connection with the scoop, as in said Patent No. 506,212, one of said draft-bars E as they may be termed being shown in the drawings. The rear extension $e$ of said bar has a beveled or oblique end, so as to provide a catch-portion on the draft-arm for engaging with the locking device.

The locking device F herein shown in Figs. 1, 2 and 3, consists of a dog or catch which is pivoted upon the scoop with its pivotal point $f$ eccentric to the pivotal connection $d$ between the yoke-arm and the scoop, and as a means for operating said locking device from and in unison with the lever, we provide a connection between the two, such as a link G. When the scoop is raised, the locking device will be free from engagement with the rear extension of the draft-arm, as in Fig. 1, but when the lever is raised so as to lower the scoop, to an operative position, the locking device will be brought into engagement with the beveled or inclined end portion of the draft-arm as in Fig. 2, and hence the scraper will be held firmly down to its work, and so maintain against tilt or vibration in a direction to dump, as long as may be necessary, it being obvious that any disposition on the part of the scraper to rock or tilt from its properly inclined working position and dump, will be opposed by the locking device, and that the strain incident to such opposition will be transmitted longitudinally along the dog or catch and come upon the pivot for the locking device, in place of coming upon the pivot for the lever. By this arrangement the lever can be advantageously pivoted at a point lower than and in rear of the pivot for the draft-arm, and the pivot for the dog or catch can be set eccentric to the pivot for the lever and also be arranged so as to place a comparatively short dog in proper relation to the rear extension of the draft-arm without observance of the point at which the lever is pivoted.

The inclined face of the dog or the inclined face of the rear end of the draft-arm is also desirably recessed or formed with one or more lips, as in Fig. 5 in which the engaging end of the dog is shown provided with a notch or recess $f'$ adapted to receive the beveled end of the draft-arm and forming sides $f^2$ which will lap the sides of rear extension of the draft-arm when the scoop is down and locked. This arrangement avoids wear and also insures steadiness when the parts are in relative locking positions.

While our invention broadly contemplates a movable dog or catch or locking device separate from the lever but operated therefrom and arranged for engaging the rear extension of the draft-arm, we prefer the pivoted dog herein shown. We may however, use other forms of pivoted catches, or we may use a sliding dog operated from the lever by suitable connection, as hereinafter set forth.

As a preferred arrangement, the lever for raising and lowering the scoop is pivoted to the latter below and in rear of the point of pivotal connection between the draft-arm and the scoop, and the vibratory dog is pivoted to the scoop at a point higher up than the pivot for the lever and in rear of the pivot for the draft-arm or bar, it being seen that the link G can be adjusted in its pivotal connection with either the dog or the lever.

With the arrangement shown in said Figs. 1, 2 and 3, the vibratory dog or locking device provides an abutment which resists the disposition of the scoop to prematurely dump while at work, and by separately pivoting it at $f$, strain is relieved from pivot $d$ for the lever-arm. It will also be seen that by thus pivoting the vibratory locking arm or dog E eccentric to the pivot for the lever-arm, the vibratory dog can be connected with the lever arm so as to have differential movement relatively thereto, that is to say have a different extent of throw, and thereby we secure the advantage of being able to pivot the lever-arm with reference to the weight and balance of the scoop and pivot the dog with reference to its allotted function as a locking device for engaging the rear extension of the draft-arm. Thus, where the parts are arranged as in Figs. 1, 2 and 3, the distance between the free or outer end of the vibratory dog E, and the nearest point on the lever-arm will be greater than when the lever-arm is swung back. Variations of this relative movement between the dog and lever-arm can also be attained by adjusting either the pivotal connection between the links and dog or the pivotal connection between the link and lever-arm as in Fig 3, and likewise, variations can be attained by varying the relative positions of pivot $f$ and $d$, thereby adapting the movement for different kinds of wheeled dumping scrapers, and also permitting a forward swing on the part of the lever arm to a determinate, convenient extent, to cause a greater extent of forward throw on the part of the vibratory locking dog. The adjustment of link G can be attained in any suitable way, for example by providing the lever-arm and vibratory dog with pivot-holes as indicated, for the link-pivots.

In Fig. 4, the locking device is formed by a sliding dog F' having a shouldered forward portion $f'$ for engaging the rear extension $e$ of the draft-bar E. The sliding dog F' works through a guide H on the scoop, and is connected with the lever-arm D by the link G, which as in preceding figures can have its pivotal connection with the lever arm, adjusted as may be desired. With this arrangement, the relative movements of the dog and lever-arm can also be varied, and the supporting guide H for the dog will bear the strain imposed upon the dog. Various advantages hereinbefore recited as incident to the vibratory dog, are obviously incident to the sliding dog, and hence need not be repeated.

While we have shown only one side of the machine, it is understood that the devices illustrated at one side thereof are provided in duplicate at the opposite side thereof, and that the lever-arms are preferably the arms of a yoke or bail.

In Fig. 1 we have shown as power transmitting connections between the lever-arm and axle, the successively acting slotted links embodied in the patent hereinbefore mentioned. We do not however confine ourselves to a dumping scraper having the particular power transmitting connection shown as means for operating the axle from the lever-arms.

What we claim as our invention is—

1. In a wheeled dumping scraper, the combination of a scoop suspended from a cranked axle, a draft-arm pivoted to the scoop and having an extension in rear of its pivotal connection therewith, a lever-arm for raising and lowering the scoop connected with the cranked axle by power transmitting connection and pivotally held upon one of the sides of the scoop, and a movable locking device arranged upon said side of the scoop for locking with the rear extension of the draft arm as a means for holding the scoop down to its work, said movable locking device being supported independent of said lever but being controlled and operated by the same, substantially as described.

2. In a wheeled dumping scraper, the combination of the suspended scoop, the draft-arm and lever separately pivoted to the scoop, said draft-arm being provided with an extension in rear of its pivotal connection, and a locking device for holding the scoop in an operative position consisting of a vibratory dog or catch pivoted eccentric to the pivot for the lever and connected therewith by motion transmitting connection, substantially as described.

3. In a dumping wheeled scraper, the combination of the scoop, the draft-arm pivoted thereto and having an extension in rear of its pivotal connection, a lever applied for raising and lowering the scoop, and pivoted thereto and a locking device for the purpose set forth consisting of a movable dog or catch operating in unison with the lever and having its engaging end provided with one or more lips $f^2$ adapted to form an offset $f'$ and arranged for lapping the side or sides of the rear extension of the draft-arm, substantially as described.

4. In a dumping wheeled scraper, the draft arm pivoted to the scoop and having an extension in rear of its pivoted connection, the lever pivoted to the scoop in rear of and lower down than the pivot for the draft arm, and a locking device for the purpose set forth consisting of a vibratory dog pivoted in rear of the pivot for the draft-arm and somewhat higher than the point at which the lever is pivoted, substantially as described.

5. In a dumping wheeled scraper, the combination of the scoop, suspended from a cranked axle the pivotal draft-arm having an extension back of its pivotal connection with the scoop, a raising and lowering lever, pivoted to the scoop and connected with the cranked axle by jointed power transmitting connection and a movable locking dog link-connected with the lever and arranged for engaging with the rear-extension of the draft arm, substantially as described.

PATRICK DEEVY.
MORTON G. BUNNELL.

Witnesses:
RETA M. WAGNER,
CHAS. G. PAGE.